United States Patent [19]

Sager

[11] Patent Number: 5,011,555
[45] Date of Patent: Apr. 30, 1991

[54] METHOD OF ULTRASONICALLY CUTTING AND SEALING THERMOPLASTIC WORKPIECES PARTICULARLY A FILTER

[75] Inventor: Thomas B. Sager, Newtown, Conn.

[73] Assignee: Branson Ultrasonics Corporation, Danbury, Conn.

[21] Appl. No.: 407,638

[22] Filed: Sep. 15, 1989

[51] Int. Cl.⁵ .................................... B29C 65/08
[52] U.S. Cl. ............................ 156/73.1; 55/491; 55/511; 156/73.3; 156/580.2; 264/23; 210/445; 210/446
[58] Field of Search ............ 156/73.1, 73.3, 580.1, 156/580.2; 264/23; 425/174.2; 55/491, 502, 505, 511; 210/445, 446

[56] References Cited

U.S. PATENT DOCUMENTS

| | | | |
|---|---|---|---|
| 3,782,083 | 1/1974 | Rosenberg | 55/502 |
| 3,824,138 | 7/1974 | Karobath et al. | 156/580.2 |
| 3,932,153 | 1/1976 | Byrns | 55/511 |
| 4,417,933 | 11/1983 | Bernat | 156/73.1 |
| 4,732,631 | 3/1986 | Shimizu | 156/73.3 |
| 4,798,639 | 1/1989 | Yamaguchi | 156/73.1 |
| 4,834,819 | 5/1989 | Todo et al. | 156/73.1 |

Primary Examiner—Michael Wityshyn
Attorney, Agent, or Firm—Polster, Polster and Lucchesi

[57] ABSTRACT

A two step process for ultrasonically welding together first and second thermoplastic pieces and welding a membrane between these two pieces. The first piece comprises an annular bead, the second piece comprises an annular energy director. The method comprises first ultrasonically cutting and sealing the membrane to the first piece using an anvil comprising an annular projection and at the same time creating a groove in the first piece. The annular bead is ultrasonically melted and thus welds the membrane to the first piece. The first and second pieces are then brought together so that the groove and energy director are aligned. Under ultrasonic action, the energy director melts within the groove creating a strong weldment without any voids or material flashing.

12 Claims, 2 Drawing Sheets

METHOD OF ULTRASONICALLY CUTTING AND SEALING THERMOPLASTIC WORKPIECES PARTICULARLY A FILTER

BACKGROUND OF THE INVENTION

This invention relates generally to the ultrasonic welding of workpieces and more particularly to a method of ultrasonically cutting and sealing a membrane between two thermoplastic pieces. Illustratively, the membrane is a woven or non-woven filter continuously welded around its periphery between mating halves of a filter housing.

Commercially available small filters may include a pair of dished housing members joined together at their rims to form a hollow body. A central nipple in each dished housing member provides a connection to the tubing carrying the fluid to be filtered. Typically, one of the nipples is proportioned to fit into the tubing, and its housing member is designated the male housing member; the other nipple is proportioned for the tubing to fit into it, and its housing member is designated the female housing member.

A woven and/or non-woven porous filter element, in the form of a disk, is trapped between the dished housing members. In one arrangement, a woven filter disk is placed over a non-woven filter disk, with the woven filter on the male housing (inlet) side. The filter elements are held at their periphery by the rims of the housing members. For sterility and to prevent leakage, it is important that the filter disks be totally contained within the filter body, without extending beyond the periphery of the body.

Filters of this type may be assembled by ultrasonic welding if the parts are made of thermoplastic material. The filter disk is ultrasonically welded to the rim of one of the housing members to form a first assembly, and then the rim of the second housing member is ultrasonically welded to the assembly. This approach requires careful handling of the filter disks, is liable to form incomplete seals, and produces a thermoplastic material flash around the area of the weld. The flash must be trimmed in a separate operation.

To eliminate the need for precutting the filter disks and the problems of handling such disks, the filter material may be placed over the first housing member, then cut and welded ultrasonically in one operation. This approach, however, produces a groove in the first housing member. It thereby weakens the assembly and increases the chance of leakage.

Similar problems occur whenever the periphery of a membrane is ultrasonically welded between housing halves.

SUMMARY OF THE INVENTION

One of the objects of the present invention is to provide a simple method for ultrasonically assembling a membrane between housing halves.

Another object is to provide such a method which reduces the number of steps required.

Another object is to provide such a method which secures the membrane and the housing halves securely and keeps the periphery of the membrane inside the assembled housing.

Another object is to provide such a method which produces a structurally strong assembly and a homogeneous weldment.

Another object is to provide such a method which produces no thermoplastic material flash in the welded area.

Other objects of this invention will be apparent to those skilled in the art in light of the following description and accompanying drawings.

In accordance with this invention, generally stated, there is provided an improved two-step method for ultrasonically welding together a housing including a first thermoplastic housing half, a second thermoplastic housing half, and a membrane between the two halves. The membrane is preferably also made of a thermoplastic material. The first half includes a rim with an energy-directing bead around its periphery. The second half includes a rim with a similarly situated energy director.

The method comprises first placing an oversized piece of filter material over the inside of the first half, then ultrasonically cutting the filter material and creating a groove within the rim of the first half. This step eliminates the need to trim the filter material in a later step, thus reducing manufacturing costs. The bead is ultrasonically melted in the same operation, so as to produce a continuous weld between the first half and the filter material.

The second step comprises ultrasonically welding the two halves together. The energy director on the second housing half is aligned with the groove formed on the first housing half, and the energy director is then ultrasonically melted to fill the groove, creating a strong, homogeneous bond between the two halves. The groove also assures a seal between the parts and eliminates the problem of flashing.

DESCRIPTION OF THE PREFERRED EMBODIMENT

Figure 1:
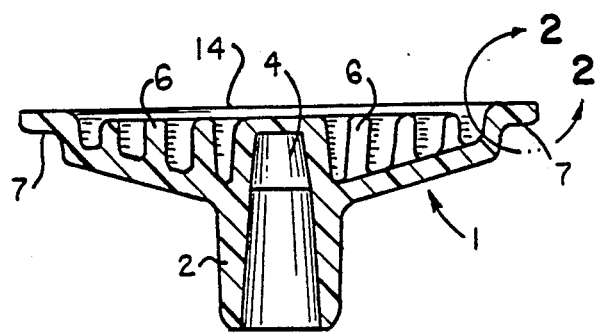
FIG. 1 is a view in axial cross-section of a female half of a filter housing
Figure 2:
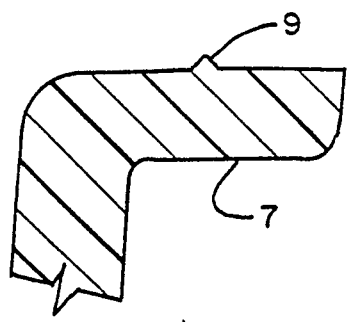
FIG. 2 is an enlarged sectional view of the periphery of the female half of FIG. 1, as indicated by line 2—2 of FIG. 1.
Figure 3:
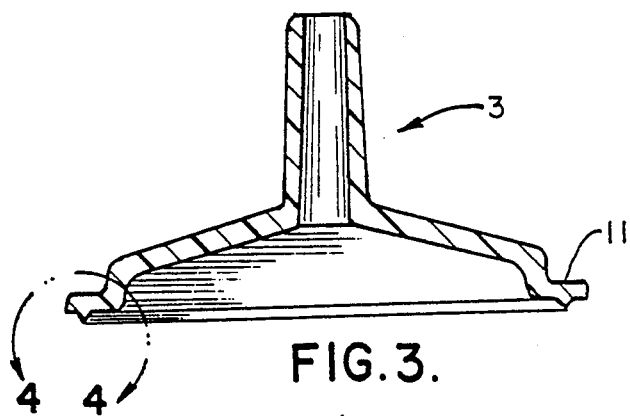
FIG. 3 is a cross-sectional area of a male half of a filter housing for use in the method of the present invention.
Figure 4:
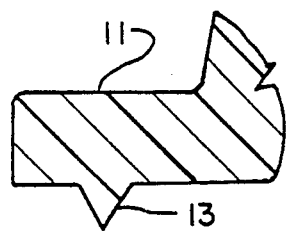
FIG. 4 is an enlarged sectional view of the periphery of the male half of FIG. 3, as indicated by line 4—4 of FIG. 3.

Referring now to the drawings, an illustrative filter assembled by the method of the present invention includes a dished female housing member 1, a dished male housing member 3, and a filter membrane 5. The housing members 1 and 3 are formed of polypropylene thermoplastic material.

The female housing member comprises a circular rim 7 with an energy director in the form of an annular bead 9 spaced from the periphery of the rim 7. The female housing member also includes a central nipple 2, having passages 4 in it, and a set of interrupted annular ribs 6; these elements are conventional and form no part of the present invention.

Figure 5:
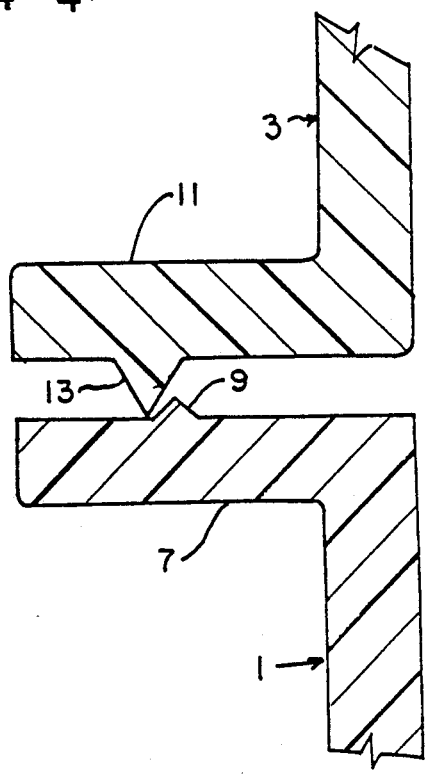
FIG. 5 is an enlarged sectional view of the male and female halves of the filter housing, without a filter element between them, showing the relationships of energy director elements of the halves.
Figure 9:
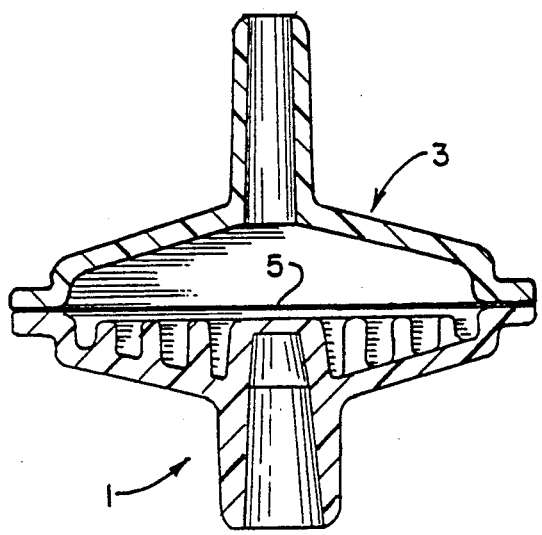
FIG. 9 is a cross-sectional view of the completed filter.

The male housing member 3 similarly comprises a rim 11 with an energy director 13 spaced slightly less far from its periphery than the bead 9 on the female housing member. Thus, when the two members are brought together, the energy director 13 lies just outside of the bead 9, as shown in FIG. 5.

The filter membrane 5 is preferably made from two layers of thermoplastic material: a porous woven layer 35 and a semi-porous non-woven layer 37.

Figure 6:
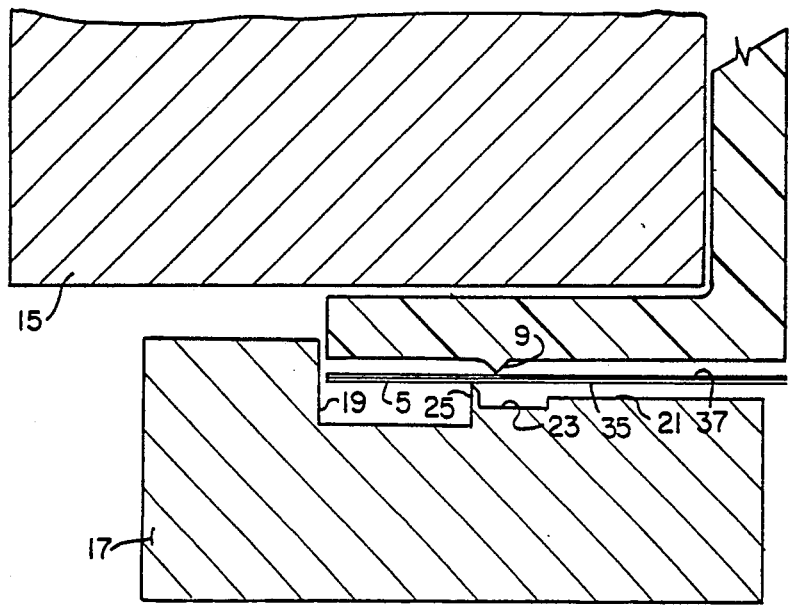
FIG. 6 is an enlarged sectional view of the female half of FIG. 1 and a pair of filter elements positioned between an ultrasonic horn and anvil of the present invention, for carrying out the first step of the method of the invention.

The filter is produced in two steps. In the first step, shown in FIG. 6, the two-layer filter membrane 5 is placed over the female housing member 1 so that it completely covers its inside face 14, including the bead 9. The female housing member 1 and the membrane 5 are then placed between an ultrasonic horn 15 and an anvil 17, with the membrane against the anvil. The anvil 17 has a circular depression 19 into which the female housing member fits. Within the depression is a raised pad 21 with a shoulder 23. At the outside edge of the shoulder 23 is a knife 25, comprising a raised annular protrusion which extends above the pad 21. The knife 25 is 0.006" wide and 0.025" high above the shoulder 23.

In the first step, the membrane 5 is cut and welded to the female housing member 1 and a groove 29 is created in the rim 7. When the ultrasonic horn is activated, the knife 25 cuts the membrane 5 and creates a groove 29 to the outside of the energy directing bead 9. At the same time, the energy directing bead 9 and the periphery of the newly-cut membrane 5 melt and create a continuous 360° weldment between the membrane 5 and the female housing member 1.

Figures 7, 8:
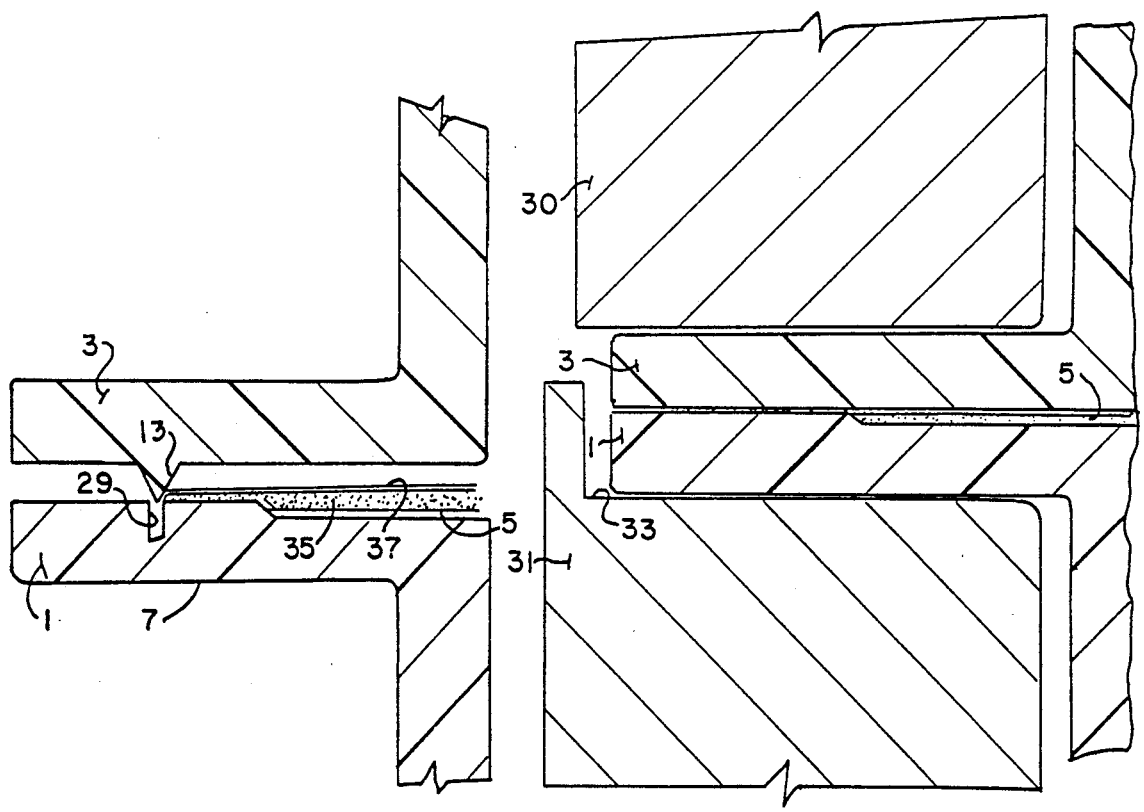
FIG. 7 is an enlarged sectional view of the male and female halves of the filter housing after the first step of the method, with the filter elements welded to the female half and a groove cut in the female half, but before welding the housing pieces together.
FIG. 8 is an enlarged sectional view of the male and female halves of the filter housing after they are welded together.

In the second step, the male and female housing members 1 and 3, respectively, are welded together. They are brought together so that the energy director 13 is lined up with the groove 29 as shown in FIG. 7. The two members are then placed between the same or a second horn 30 and a second anvil 31. Second anvil 31 has a depression 33 which receives the outside surface of the female housing member. When the horn 30 is activated, the ultrasonic action melts the energy director 13 and groove 29, at their interface, forming a continuous 360° weld between the two members as shown in FIG. 8. The energy director and the groove form a homogeneous weldment without any voids, and thereby eliminate the weakness created in the female housing member by the groove. The use of the groove also eliminates the prior art problem of flashing. The groove 29 is sized to contain most of the material in the energy director 13.

Numerous variations, within the scope of the appended claims, will be apparent to those skilled in the art in light of the foregoing description and accompanying drawings. Merely by way of example, the method could be applied to the sandwiching of any thin material between two thermoplastic pieces.

I claim:

1. A two step method for ultrasonically welding two pieces of thermoplastic material together with a membrane between said pieces, each piece having a peripheral rim; a first said piece having a continuous annular bead on the inside of the rim of said first piece; a second of said pieces having a continuous annular energy director on the inside of the rim of said second piece; said method comprising
  a. placing said membrane over the inside of said first piece such that said membrane covers said bead, ultrasonically cutting said membrane and creating a groove in the rim of said first piece, and ultrasonically melting said bead so as to weld said membrane to said first piece; and
  b. bringing together said first and second pieces so that said energy director lines up with said groove, and ultrasonically melting said energy director so that it fills said groove creating a strong weld between said pieces.

2. The method of claim 1, wherein said membrane is made of a thermoplastic material.

3. The method of claim 2 wherein said membrane comprises first and second layers of flexible material.

4. The method of claim 3 wherein the layers of flexible material are porous, and the membrane and said pieces form a filter.

5. The method of claim 4 wherein each of the pieces includes a central nipple for connecting the filter into a fluid line.

6. A method for ultrasonically welding together three pieces of thermoplastic material, comprising a first step of overlaying a first said piece on a second said piece, a second step of creating an assembly by ultrasonically welding said first and second pieces to each other and simultaneously ultrasonically cutting through said first piece and cutting a groove in said second piece, a third step of overlaying a third said piece over said assembly, said third piece comprising an energy director congruent with said groove, and a fourth step of ultrasonically joining said groove in said second piece with said energy director of said third piece to form a weld.

7. The method of claim 6, wherein said groove and said energy director are continuous and extend near the peripheries of said second and third pieces.

8. The method of claim 6, wherein said second piece of thermoplastic material includes an energy director, said groove being formed adjacent and outside said energy director.

9. The method of claim 8, wherein said first piece of thermoplastic material overlays said second piece energy director, said second step further including simultaneously ultrasonically melting said second piece energy director thereby welding said second piece to said first piece.

10. The method of claim 6 wherein said fourth step comprises ultrasonically melting said third piece energy director so that it fills said groove, whereby there is no thermoplastic material flash at the area of the weld.

11. The method of claim 10 wherein said second step comprises cutting said groove near the periphery of said second piece.

12. The method of claim 11 wherein said method comprises forming said groove substantially continuously around said periphery of said second piece, whereby said weld created in said fourth step is a liquid impervious weld.

* * * * *